June 21, 1932.  C. C. STEDMAN  1,864,324
TRACTOR STEERING ATTACHMENT
Filed July 24, 1930

Inventor
C. C. Stedman
By Freast and Bishop
Attorneys

Patented June 21, 1932

1,864,324

UNITED STATES PATENT OFFICE

CHARLES C. STEDMAN, OF CLEVELAND HEIGHTS, OHIO, ASSIGNOR TO CENTAUR TRACTOR CORPORATION, OF GREENWICH, OHIO, A CORPORATION OF OHIO

TRACTOR STEERING ATTACHMENT

Application filed July 24, 1930. Serial No. 470,276.

The invention relates to tractors and more particularly to means adapted to facilitate or assist in the steering or turning of tractors of the front wheel drive type.

While for many purposes front wheel drive tractors are desirable, considerable difficulty has been experienced in the past in steering such tractors around a turn or curve owing to the fact that the weight of the load constituting the sulky or implement pivotally connected to the tractor has a tendency to keep the front wheels of the tractor alined in position to move straight forward, making it necessary to exert considerable power and effort in the turning of the steering wheel or other steering mechanism in order to turn the tractor.

The object of the present improvement is to provide an attachment to tractors of the front wheel type arranged to greatly assist in the turning of the tractor in either direction, making it possible for the tractor to be easily and readily steered in any desired direction with a minimum of effort and exertion upon the part of the operator.

The above and other objects which will be readily apparent from the following detailed description of the invention may be accomplished by providing an attachment including a rod or link pivotally connected to the drawbar, which pivotally connects the sulky or other implement to the tractor, spring means being connected to the forward end of the link or rod and attached to the front portion of the tractor frame in order to overcome the tendency of the load of the sulky or implement to pull the front wheels of the tractor into position to travel straight forward.

Figure 1:
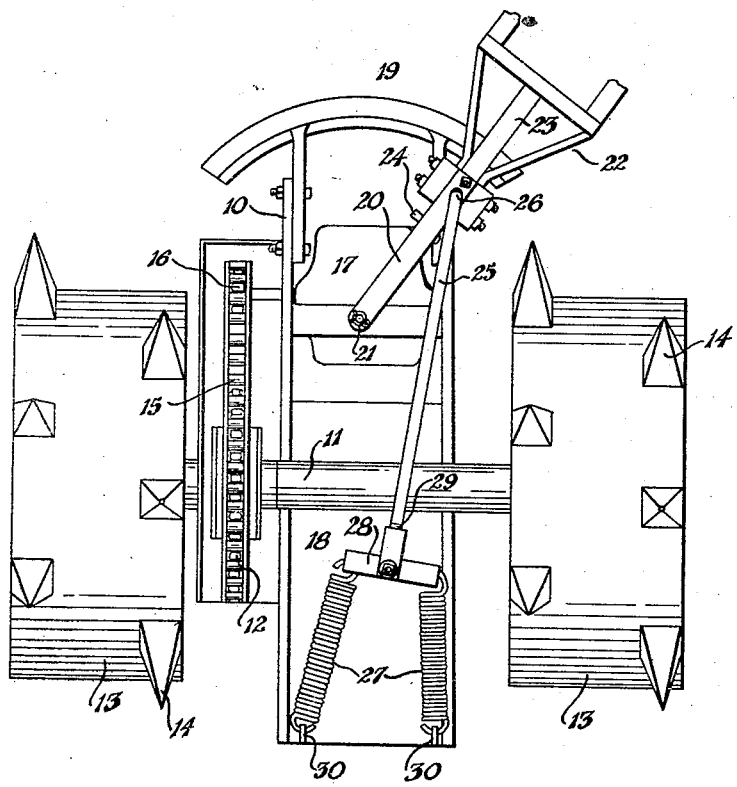
Figure 2:
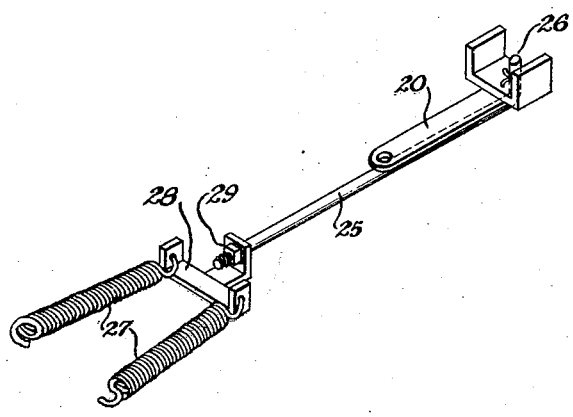

An embodiment of the invention is illustrated in the accompanying drawing, in which Figure 1 is a bottom plan view of a front wheel drive tractor with the improved steering attachment mounted thereon, showing the operation of the steering attachment when the tractor is turned; and Fig. 2, a detached perspective view of the improved steering attachment.

Similar numerals refer to similar parts throughout the drawing.

For the purpose of this invention the tractor per se may be of any usual and well known construction of the two wheel or front drive type and may comprise the frame 10 provided with the axle 11 located transversely through the frame and journaled in suitable bearings therein.

The sprocket 12 may be mounted upon the axle and associated with a suitable clutch arranged to be manually operated in usual and well known manner.

Traction wheels 13 are mounted upon the axle and preferably provided with the usual cleats 14 for gripping the ground surface as the tractor is operated thereover.

A sprocket chain 15 may connect the sprocket 12, upon the wheel axle, with a drive sprocket 16 associated with suitable drive gearing in the gear housing 17 in usual and well known manner.

The engine 18 is mounted upon the forward portion of the tractor frame and connected in usual and well known manner with the gears in the housing 17.

A gear segment 19 may be fixed to the rear end of the tractor frame for cooperation with the steering mechanism which may be of any desirable construction, preferably such as shown in my prior Patent No. 1,690,141, dated November 6, 1928.

A drawbar 20 is pivotally connected to the under portion of the tractor frame, near the rear end thereof as by the kingbolt 21 and the sulky or other implement, indicated generally at 22, may be provided with a rigid drawbar 23 which is rigidly attached to the pivoted drawbar 20 in any usual and well known manner, as by the pin 24.

When such a tractor is operated, it has been found by experience that there is a strong tendency for the sulky or other implement to maintain itself in alinement with the tractor per se and when the tractor is turned in either direction, by the steering mechanism, the back pull of the sulky tends to hold the front wheels of the tractor against turning.

The present invention pertains to an attachment for assisting in the steering of the tractor to greatly facilitate the turning of the front wheels in either direction and comprises a tension device located between the pivoted drawbar and the tractor frame for overcoming the back pull of the sulky or implement when the wheels are turned.

This attachment includes a rod or link 25 pivotally connected at its rear end to the pivoted drawbar 20, as indicated at 26, one or more springs being connected to the forward end of the rod 25 and attached to the forward portion of the tractor frame.

As shown in the drawing, two springs 27 are preferably used, these springs being connected at their rear ends to a crossbar 28 which is adjustably secured to the forward end of the rod 25 as indicated at 29, the forward ends of the springs 27 being attached to the front portion of the tractor frame as shown at 30.

In the operation of the tractor, when the steering mechanism is operated to turn the front wheels 13 in either direction, it will be seen that as soon as the turning movement is started, so as to throw the pivoted drawbar 20 over center, the pull of the springs 27 will compensate for the back pull or drag of the sulky or implement and will tend to throw the parts into the position shown in Fig. 1, permitting the front wheels to be easily turned to any desired extent.

The tension on the springs 27 may be adjusted to accommodate any desired load of sulky or implement, or to suit the working conditions of the implement by adjusting the means 29 between the rod 25 and the crossbar 28.

I claim:

1. In combination with a front wheel drive tractor having a frame, a drawbar pivoted to the frame, and an implement trailing the drawbar and connected thereto; a link pivotally connected at its rear end to the drawbar in rear of the pivot thereof, and a forwardly disposed spring connected to the forward end of the link and to the forward portion of the frame.

2. In combination with a front wheel drive tractor having a frame, a drawbar pivoted to the frame, and an implement trailing the drawbar and connected thereto; a link pivotally connected at its rear end to the drawbar in rear of the pivot thereof, a crossbar carried by the forward end of the link and forwardly disposed springs connected to said drawbar and to the forward portion of the frame.

3. In combination with a front wheel drive tractor having a frame, a drawbar pivoted to the frame and an implement trailing the drawbar and connected thereto, spring means pivotally connected at its rear end to the drawbar in rear of the pivot thereof and at its forward end to the frame for compensating for the back pull of the implement when the tractor wheels are turned.

4. In combination with a front wheel drive tractor having a frame, a drawbar pivoted to the frame and free to swing upon its pivot and an implement trailing the drawbar and connected thereto, spring means pivotally connected to the drawbar at a point spaced in rear of the pivot thereof and to the forward portion of the frame.

In testimony that I claim the above, I have hereunto subscribed my name.

CHARLES C. STEDMAN.